United States Patent
Krenz

(10) Patent No.: US 8,139,025 B1
(45) Date of Patent: Mar. 20, 2012

(54) CURSOR POSITIONING VIA VOICE RECOGNITION

(75) Inventor: Michael J. Krenz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 689 days.

(21) Appl. No.: 11/394,806

(22) Filed: Apr. 1, 2006

(51) Int. Cl.
*G09G 5/00* (2006.01)

(52) U.S. Cl. ........ 345/156; 345/157; 345/160; 345/161; 345/163; 704/275; 715/856

(58) Field of Classification Search .................. 345/156, 345/157, 160–163; 704/275; 715/856
See application file for complete search history.

(56) References Cited

U.S. PATENT DOCUMENTS

| | | | | |
|---|---|---|---|---|
| 5,369,508 A | * | 11/1994 | Lech et al. | ...................... 358/462 |
| 5,371,901 A | * | 12/1994 | Reed et al. | ....................... 455/69 |
| 5,818,423 A | * | 10/1998 | Pugliese et al. | ............... 345/157 |
| 5,920,841 A | | 7/1999 | Schottmuller et al. | |
| 5,974,384 A | | 10/1999 | Yasuda | |
| 6,072,473 A | * | 6/2000 | Muller et al. | ................. 345/173 |
| 6,424,357 B1 | * | 7/2002 | Frulla et al. | .................... 715/728 |
| 6,499,015 B2 | * | 12/2002 | Brooks et al. | ................. 704/275 |
| 6,664,989 B1 | * | 12/2003 | Snyder et al. | ................. 715/856 |
| 2002/0120372 A1 | * | 8/2002 | Lafon et al. | ........................ 701/3 |
| 2005/0251755 A1 | * | 11/2005 | Mullins et al. | ................ 715/779 |

* cited by examiner

*Primary Examiner* — Lun-Yi Lao
*Assistant Examiner* — Insa Sadio
(74) *Attorney, Agent, or Firm* — Donna P. Suchy; Daniel M. Barbieri

(57) ABSTRACT

A cursor positioning system for a computer display system includes a coarse positioning subsystem and a fine positioning subsystem. The coarse positioning subsystem provides a coarse positioning signal to a cursor control and rendering subsystem of a computer display system. The coarse positioning subsystem includes a voice recognition system. The coarse positioning signal provides coarse positioning of a cursor to a region of interest (ROI) on a computer display of the computer display system. The fine positioning subsystem is operatively associated with the coarse positioning subsystem for providing a fine positioning signal to the cursor control and rendering subsystem. The fine positioning signal provides fine positioning of the cursor within the ROI on the computer display. The fine positioning subsystem is operatively associatable with a cursor control device.

14 Claims, 2 Drawing Sheets

CURSOR POSITIONING VIA VOICE RECOGNITION

BACKGROUND OF THE INVENTION

1. Field of the Invention

The present invention relates generally to computer display systems, and more particularly to voice controlled cursor positioning for computer display systems.

2. Description of the Related Art

The use of cursors in a multi-display environment can be problematic if the cursor is either "lost" or a long distance from where it is desired. This can be especially true, for example, in an aircraft cockpit environment with several displays utilizing cursors to access or manipulate data on one of several screens. The cursor is often blocked by, for example, flight critical information. Furthermore, because of the motion of the aircraft the cursor may bounce around. Manipulation of the cursors in aircraft is typically provided by a trackball or a joystick. It would be desirable for the user to have a means to instantly move the cursor to a region of interest.

There are numerous patents that have issued that have involved voice recognition in conjunction with cursor positioning in computer displays. These include the following:

U.S. Pat. No. 5,920,841, entitled "Speech Supported Navigation of a Pointer in a Graphical User Interface," discloses a method and an apparatus for speech controlled navigation of a pointer in a graphical user interface. The method and apparatus therefore provides a space of discrete position states (quantization) for the pointer which can be navigated only via those discrete positions by means of speech command input. The granularity of the discrete position states can be adapted to the respective application window and the position states can be represented by a system of coordinates where the speech command input is based on absolute or relative coordinates. Advantageously a copy image of the graphical user interface of operation can be provided in front of or beside the actual user interface and a proxy pointer device is displayed on the copy image. In one embodiment, only the copy image comprises the discrete position states, and the speech input commands are only transferred to the copy image. Navigation of the proxy pointer device within the copy is transferred and converted into commands within the actual user interface. By the method of the '841 patent an operation event affected by a manipulation of the proxy pointer affects a corresponding event at the user interface. The '841 implementation implies the use of a grid-type overlay with the user moving the cursor on the grid.

U.S. Pat. No. 6,499,015, entitled "Voice Interaction Method for a Computer Graphical User Interface," discloses an invention that enables a computer user to select a function represented via a graphical user interface by speaking command related to the function into audio processing circuitry. A voice recognition program interprets the spoken words to determine the function that is desired for execution. The user may use the cursor to identify an element on the graphical user interface display or speak the name of that element. The computer responds to the identification of the element by displaying a menu of the voice commands associated with that element. The '015 patent is focused on the execution of commands, not the positioning of a cursor.

U.S. Pat. No. 6,424,357, entitled "Voice Input System and Method of Using Same," discloses a voice input system that has a microphone coupled to a computing device, with the computing device typically operating a computer software application. A user speaks voice commands into the microphone, with the computing device operating a voice command module that interprets the voice command and causes the graphical or non-graphical application to be commanded and controlled consistent with the use of a physical mouse. In one form of the invention, voice commands are overlayed on normal command points of the application program. Such voice commands are stored in a separate voice command repository, with an edit mode provided to create new voice command sequences and to edit existing voice command sequences. The '357 patent is focused on the execution of commands and fine positioning of the cursor.

U.S. Pat. No. 5,974,384, entitled "Window Control Apparatus and Method Having Function for Controlling Windows by Means of Voice-Input," discloses a display unit that displays at least a window from among a plurality of windows. A window switching unit switches a currently active window between windows among the plurality of windows in accordance with a corresponding voice-input, the voice-input comprising relationship command indicating a relationship between the currently active window and a window to be activated from the windows among the plurality of windows. The relationship command indicates a relationship concerning an arrangement of the plurality of windows, the relationship comprising a relationship between the currently active window and a window to be activated from the windows among the plurality of windows. In many multi-display applications, including, for example, an aircraft cockpit environment, there is no particular concept of an "active window". However, cursor positioning is required to be managed in an efficient manner.

U.S. Pat. No. 5,818,423, entitled "Voice Controlled Cursor Movement," discloses a process in which an element (e.g., a location pointer in a windowed graphical user interface) shown on a computer display is moved toward a target position. A user's input is recognized which identifies a subregion of the display in which the target position is located. The element is moved discontinuously to a location within the identified subregion. Then a next user's input is recognized which identifies a sub-subregion of the subregion of the display in which the target position is located. The element is moved discontinuously to a location within the identified sub-subregion. In another aspect, an element is dragged between two locations on a computer display. User commands are accepted which indicate the two locations. Then the element is dragged between them. The user commands identify a sequence of discontinuous jumps for moving the element to the indicated location.

In many multi-display environments, in addition to being able to move the cursor in a coarse way to a region of interest, it is desirable to provide fine positioning of the cursor, and for both types of positioning to be provided in an efficient manner. This is critical, for example, in the aircraft cockpit environment.

SUMMARY OF THE INVENTION

In a broad aspect, the present invention is a cursor positioning system for a computer display system that includes a coarse positioning subsystem and a fine positioning subsystem. The coarse positioning subsystem provides a coarse positioning signal to a cursor control and rendering subsystem of a computer display system. The coarse positioning subsystem includes a voice recognition system. The coarse positioning signal provides coarse positioning of a cursor to a region of interest (ROI) on a computer display of the computer display system. The fine positioning subsystem is operatively associated with the coarse positioning subsystem for providing a fine positioning signal to the cursor control and rendering subsystem. The fine positioning signal provides fine positioning of the cursor within the ROI on the computer display. The fine positioning subsystem is operatively associatable with a cursor control device.

As used herein, the term "coarse positioning" refers to a discontinuous move to a defined position, i.e. absolute "move to here" type positioning. The term "fine positioning" refers to a relative change in position from the previous position, e.g. change in x and/or change in y coordinate.

The cursor positioning system of the present invention, by integrating the coarse positioning subsystem that uses voice recognition with the fine positioning subsystem, provides an effective and efficient manner of cursor controlled movement in a multi-display environment.

This is particularly advantageous in an aircraft cockpit environment where sole dependence of voice activation is certainly not desired. For example, the U.S. Pat. No. 5,818,423 noted above involves the discontinuous movement of the cursor, by voice recognition. If utilized in an aircraft, an accidental use of a word or phrase could trigger an unintended coarse position change that could be catastrophic.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
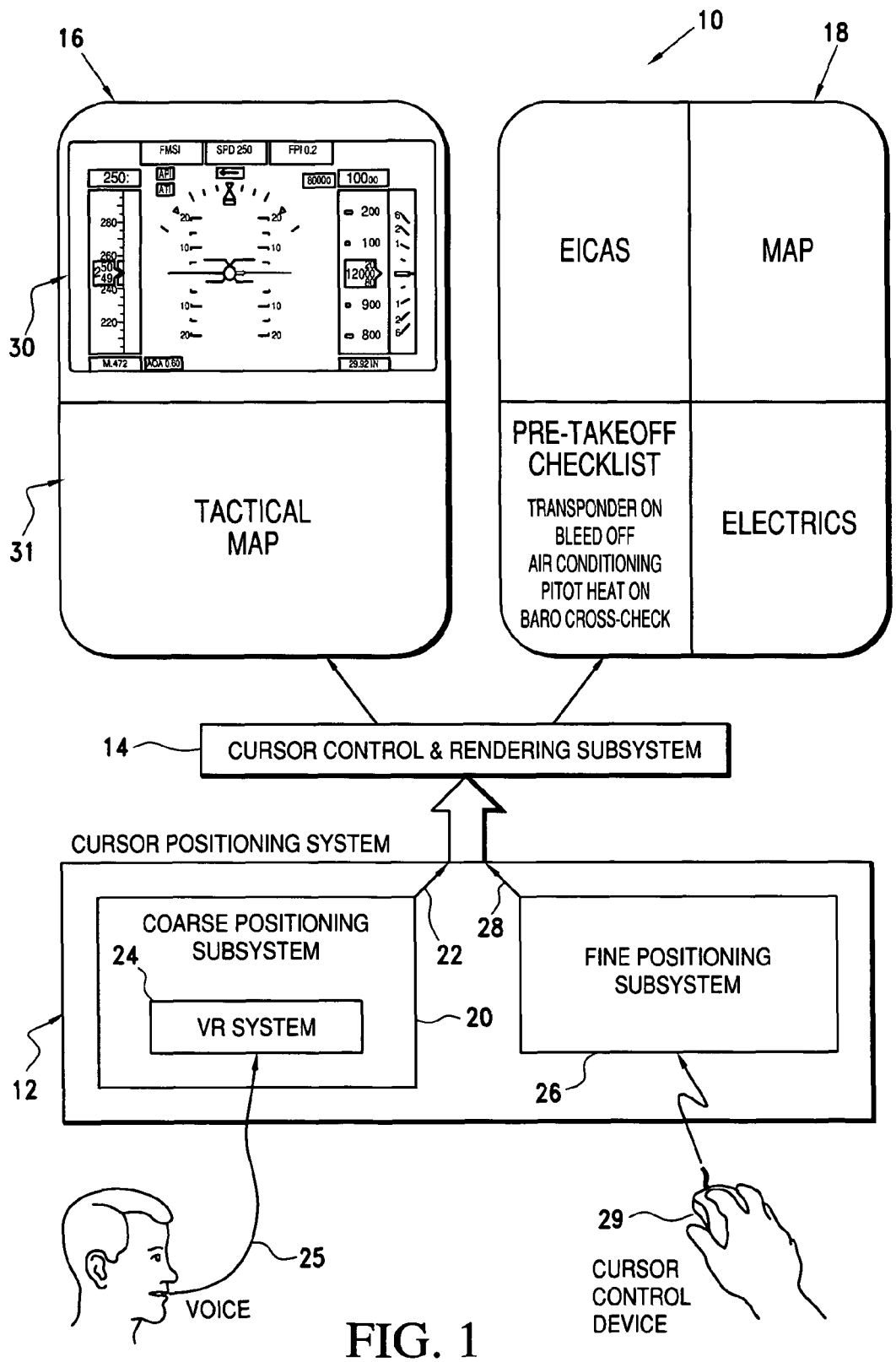
FIG. 1 is a block diagram of the cursor positioning system of the present invention, as shown utilized with a cursor control and rendering subsystem, primary flight display and multi-function display of an aircraft.

Referring now to the drawings and the characters of reference marked thereon, FIG. 1 illustrates a computer display system, designated generally as 10. The computer display system 10 includes a cursor positioning system of the present invention, designated generally as 12, a cursor control and rendering subsystem 14, and displays 16 and 18.

The cursor positioning system 12 includes a coarse positioning subsystem 20 for providing a coarse positioning signal 22 to a cursor control and rendering subsystem 14 of the computer display system 10. The coarse positioning subsystem 20 includes a voice recognition system 24 responsive to a voice 25. The coarse positioning signal 22 provides coarse positioning of a cursor to a region of interest (ROI) on one of the computer displays 16, 18 of the computer display system 10. The voice recognition (VR) system may be, for example, any number of commercially available systems, such as that produced by IBM Corp. trademarked ViaVoice® software; DRAGON® software by Nuance Communications, Inc.; KURZWEIL VOICE™ software and related products by Kurzweil Applied Intelligence, Inc.; and, SAPI (Speech Application Programming Interface) speech services integrated in the Microsoft Windows operating system speech recognition software. The voice recognition system may be a keyword actuated voice recognition system. It may also include a Push-To-Recognize (P-T-R) component.

The cursor positioning system 12 includes a fine positioning subsystem 26 operatively associated with the coarse positioning subsystem 20 for providing a fine positioning signal 28 to the cursor control and rendering subsystem 14. The fine positioning signal 28 provides fine positioning of the cursor within the ROI on the respective computer display. The fine positioning subsystem 26 is operatively associatable with a cursor control device 29. The cursor control device 29 is non-voice actuated and may be, for example, a mouse, trackball, joystick, stylus, pointing stick, or light pen.

FIG. 1 illustrates the application of the present cursor positioning system on a computer display system such as found in an aircraft cockpit. A display 16 may include, for example, a Primary Flight Display (PFD) 30 which shows information about course, speed, altitude, rate of climb and other information. The display 16 is typically an electronic display such as a cathode ray tube or back-lit liquid crystal display. The PFD 30 may not be a region of interest (ROI). The lower half of the display 16 may typically include a tactical map 31. The tactical map 31 may be an ROI that is selectable via voice recognition. The tactical map may be, for example, a horizontal situation indicator.

The multifunction display 18 shown on the right side of the multifunction display may include, for example, the following: EICAS, CHECKLIST, SCRATCHPAD, RADIO TUNING, MAP, ELECTRICS, FMS, and WEATHER RADAR. EICAS, MAP, PRE-TAKEOFF CHECKLIST, and ELECTRICS are shown as ROI's in the FIG. 1 example. These ROI's are selectable by voice recognition.

Voice commands may include, for example, the following: "CURSOR CAS", "CURSOR MAP" or for example, "MOVE CURSOR TO CAS", "MOVE CURSOR TO MAP".

In the example shown in FIG. 1, details within an ROI designated PRE-TAKEOFF CHECKLIST are shown. Items within this PRE-TAKEOFF CHECKLIST may be engaged via the cursor control device 29 operatively associated with the cursor positioning system 12. Such items may include, as shown in FIG. 1, TRANSPONDER ON, BLEED OFF, AIR CONDITIONING, PITOT HEAT ON, AND BARO CROSS-CHECK. In an aircraft, the commonly used cursor control device 29 is a trackball although there is some momentum in utilizing joysticks.

Figure 2:
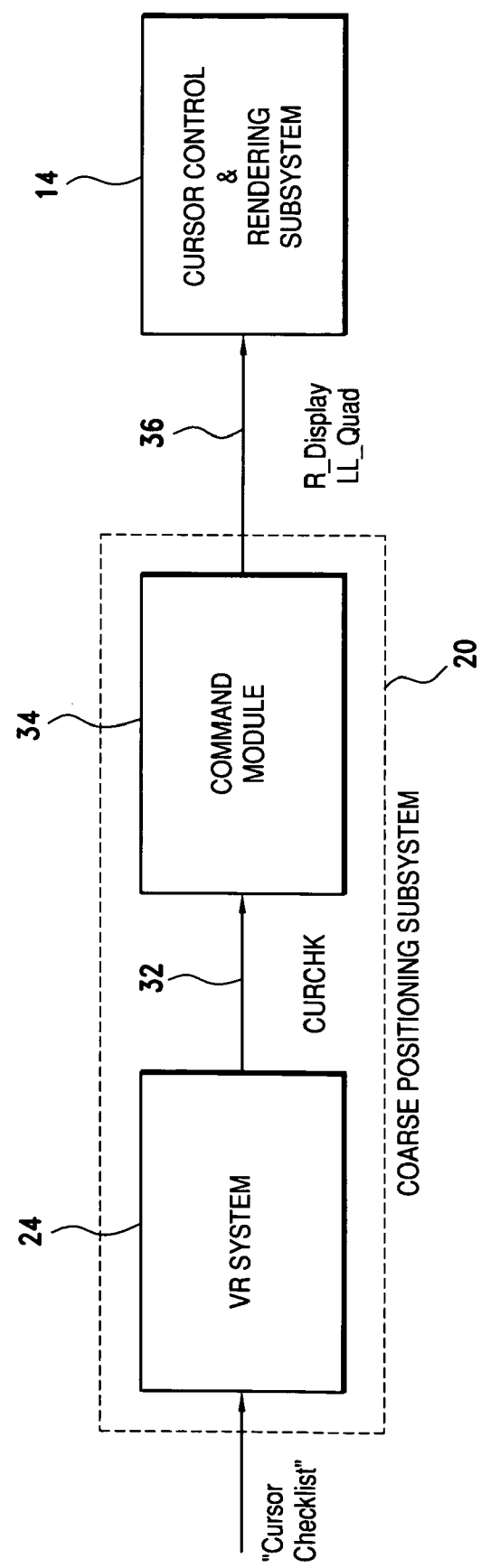
FIG. 2 is a block diagram illustrating the use of the cursor positioning system.

Referring now to FIG. 2, operation of the coarse positioning subsystem 20 is illustrated. The coarse positioning subsystem 20 includes a command module 34 for sending a command to the cursor control and rendering subsystem 14. When the user states, for example, "Cursor Checklist", the VR system 24 of the coarse positioning subsystem 20 receives this command and provides an output signal 32, for example, CURCHK, as shown in FIG. 2. This signal is provided to the command module 34 that processes the output signal 32 from the VR system 24 and sends a command 36 to the cursor control and rendering subsystem 14. As shown, the command 36 may be, for example, R_Display, LL_Quad, i.e. identifications as to which display, and portion of that display that the cursor should be positioned.

The command module 34 utilizes information on the current location of items of interest to generate an appropriate position command to the cursor control and rendering subsystem 14. This distinguishes the present invention from, for example, U.S. Pat. No. 5,920,841, discussed above, that relies upon pure location rather than context. With the '841 device the voice command specifies a location relative to the physical display. Thus, for example, a voice command such as "move upper left" would direct the cursor to the upper left corner of the current physical screen regardless of what is currently displayed there. With the present invention, on the other hand, a command is issued relative to the content of where cursor movement is desired. For example, the command "Move to Checklist" will direct the cursor to wherever the checklist is currently displayed. If the ROI is not currently on a display, the voice command requesting positioning to that ROI may cause that ROI to become visible and then position the cursor in the ROI. (Alternatively, the system may be configured so that a signal may be provided to the pilot indicating that the cursor is not on a display instead of automatically positioning the cursor.)

The command module 34 may include additional systems to augment the voice recognition system 24. For example, it may include dedicated push buttons, soft buttons on a display, or other sensory modules (e.g. haptic, eye tracking, etc.) to provide the command to the cursor control and rendering subsystem 14. Regardless of where the command is received, the command module translates the command into a consistent signal that the cursor control and rendering subsystem 14 can use to place the cursor appropriately.

Although the principles of the present invention have been discussed in particular with respect to their application to an aircraft cockpit display this invention may be used in many multi-display systems such as, by way of illustration and not limitation, vehicles other than aircraft, video production suites, live stage production control rooms, etc.

Other embodiments and configurations may be devised without departing from the spirit of the invention and the scope of the appended claims.

The invention claimed is:

1. A cursor positioning system operatively connected to a cursor control rendering subsystem for controlling the cursor position on an aircraft cockpit computer display system, comprising:
   a) a coarse positioning subsystem for providing a coarse positioning signal to a cursor control and rendering subsystem of a computer display system, said computer display system comprising a plurality of displays of an aircraft cockpit, said coarse positioning subsystem comprising a voice recognition system, said coarse positioning signal for providing coarse positioning of a cursor in a discontinuous manner to a named region of interest (ROI) on a computer display of the computer display system only in response to an operator's voice, said ROI defining a plurality of items; and,
   b) a fine positioning subsystem operatively associated with said coarse positioning subsystem for providing a fine positioning signal to the cursor control and rendering subsystem, said fine positioning signal for providing fine positioning of the cursor after said coarse positioning, for selecting said items within said ROI on the computer display, said fine positioning subsystem being operatively associatable with a non-voice actuated cursor control device.

2. The cursor positioning system of claim 1, wherein said cursor is positionable on selected displays of said plurality of displays.

3. The cursor positioning system of claim 1, wherein said computer display system, comprises primary flight displays and multi-function displays of an aircraft cockpit.

4. The cursor positioning system of claim 1, wherein said voice recognition system comprises a Push-To-Recognize (P-T-R) voice recognition system.

5. The cursor positioning system of claim 1, wherein said voice recognition system comprises a keyword actuated voice recognition system.

6. The cursor positioning system of claim 1, wherein said coarse positioning subsystem includes a command module for sending a command to the cursor control and rendering subsystem.

7. The cursor positioning system of claim 1, wherein said coarse positioning subsystem includes a command module for sending a command to the cursor control and rendering subsystem, said command module utilizing information on the current location of items of interest to generate an appropriate position command to said cursor control and rendering subsystem.

8. A computer display system, comprising:
   a) a plurality of computer displays of an aircraft cockpit;
   b) a cursor control and rendering subsystem operatively connected to said plurality of computer displays; and,
   c) a cursor positioning system operatively connected to said cursor control and rendering subsystem, comprising:
      a) a coarse positioning subsystem for providing a coarse positioning signal to said cursor control and rendering subsystem, said coarse positioning subsystem comprising a voice recognition system, said coarse positioning signal for providing coarse positioning of a cursor in a discontinuous manner to a named region of interest (ROI) on one of said computer displays of the computer display system only in response to an operator's voice, said ROI defining a plurality of items; and,
      b) a fine positioning subsystem operatively associated with said coarse positioning subsystem for providing a fine positioning signal to said cursor control and rendering subsystem, said fine positioning signal for providing fine positioning of the cursor after said coarse positioning, for selecting said items within said ROI on the computer display, said fine positioning subsystem being operatively associatable with a non-voice actuated cursor control device.

9. The cursor positioning system of claim 8, wherein said cursor is positionable on selected displays of said plurality of displays.

10. The computer display system of claim 8, wherein said computer display system, comprises primary flight displays and multi-function displays of an aircraft cockpit.

11. The computer display system of claim 8, wherein said voice recognition system comprises a Push-To-Recognize (P-T-R) voice recognition system.

12. The computer display system of claim 8, wherein said voice recognition system comprises a keyword actuated voice recognition system.

13. The computer display system of claim 8, wherein said coarse positioning subsystem includes a command module for sending a command to the cursor control and rendering subsystem.

14. The computer display system of claim 8, wherein said coarse positioning subsystem includes a command module for sending a command to the cursor control and rendering subsystem, said command module utilizing information on the current location of items of interest to generate an appropriate position command to said cursor control and rendering subsystem.

* * * * *